UNITED STATES PATENT OFFICE.

HENRY D. DUPEE, OF BOSTON, MASSACHUSETTS.

IMPROVEMENT IN MORDANTING TEXTILE FABRICS.

Specification forming part of Letters Patent No. 192,491, dated June 26, 1877; application filed May 7, 1877.

*To all whom it may concern:*

Be it known that I, HENRY D. DUPEE, of Boston, in the Commonwealth of Massachusetts, have invented certain new and useful Improvements in Printing Textile Fabrics, whereof the following is a full, clear, and exact description.

Many coloring matters used in printing woven fabrics are fixed or mordanted thereon by being thoroughly intermixed with some viscid substance which adheres well to the fibers of the cloth when solidified thereon, and is capable of becoming, to a high degree, insoluble by exposure to steam.

Among the cementing agents or vehicles for these so-called "steam-colors," albumen is the most important and the best hitherto known, but its relatively high cost materially increases the expense of printing by this mode. Gluten and caseine, each in combination with some chemical agent to promote insolubility, have also been employed for this purpose to a limited extent; but the comparative inefficiency of these and other proposed substitutes for albumen, and the practical difficulties attending their application, have prevented the adoption of them into general use.

The object of my invention, therefore, is to provide a cheap and practically available agent for cementing coloring matters upon textile fabrics; and this I have accomplished by the employment of gelatine and chromic acid, so combined as to form a comparatively insoluble mordant capable of fixing the colors intermixed therewith firmly upon the fibers of the cloth.

For this purpose glue may be used instead of the purer form of gelatine, and the chromic acid employed need not be chemically pure. Moreover, certain of the acid chromates—such, for instance, as dichromate of calcium—wherein the base does not wholly counteract or seriously interfere with the action appropriate to free chromic acid, may produce good practical results, but bichromate of potash will not answer.

The following I have found to be an efficient mode of practicing my invention:

Four parts of a solution of glue, of good quality, having a specific gravity of 5° Baumé, at a temperature of 100° Fahrenheit, are mixed with one part of a solution of chromic acid at 2° Baumé, and then a sufficient quantity of the proper pigment or dye to produce the color and shade desired is added and intimately commingled therewith.

The color-mixture so prepared should, while using, be kept warm enough to prevent undue thickening by congelation, and the cloth, after being printed therewith, is dried, steamed, and finished in the usual manner for such styles.

The color-mixture may also be made by introducing the coloring matter into the solution of glue, and the cloth, after being printed or padded therewith, may be passed through a solution of chromic acid at 1° Baumé, or the cloth may first be padded with the solution of chromic acid and then the glue solution containing the color may be printed thereon; but the cloth so treated should then be washed and dried before steaming and finishing.

By this means I am enabled to produce upon textile fabrics "fast colors," equal and even superior in degree of durability and permanence to those obtained by the use of albumen, and at much less expense.

The coloring matters to which my invention is applicable embrace all pigments, lakes, and dyes which are not decomposed or injuriously affected by the chromic acid, or which in turn do not interfere with the proper function of either of the constituents of the cementing agent itself—such, for instance, as ultramarine blue, Guignet green, carbon gray, iron buff, and in fact a large part of the entire class of colors hitherto fixed with albumen; also, fuchsine, aniline purple, methyl, and iodine green, and other dyes.

The proportion of chromic acid may sometimes be considerably greater than that above stated without materially affecting the practical result, but in most cases it is desirable to use as little of it as is consistent with its efficient action upon the gelatine.

The mordant, with the color contained therein, may also be fixed upon the cloth by prolonged exposure to heated air, but such treatment is less efficient and more troublesome than the application of steam for that purpose.

A textile fabric such as above described is made the subject of another application for patent.

I claim—

The art of cementing or mordanting coloring matters upon textile fabrics, substantially as described, by means of gelatine combined with chromic acid, and subjected to the action of steam.

In testimony whereof I have signed my name to this specification in the presence of two subscribing witnesses.

HENRY DORR DUPEE.

Witnesses:
G. W. GREGORY,
E. C. PERKINS.